(12) United States Patent
King et al.

(10) Patent No.: US 7,837,366 B2
(45) Date of Patent: Nov. 23, 2010

(54) AMBIENT LIGHTING MODULE

(75) Inventors: Douglas J. King, Troy, MI (US); Brian K. Morrison, Harrison Township, MI (US); Scott Lucy, Lake Orion, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 431 days.

(21) Appl. No.: 12/060,414

(22) Filed: Apr. 1, 2008

(65) Prior Publication Data

US 2008/0304274 A1 Dec. 11, 2008

Related U.S. Application Data

(60) Provisional application No. 60/933,987, filed on Jun. 8, 2007, provisional application No. 60/921,390, filed on Apr. 2, 2007.

(51) Int. Cl.
*B60Q 1/00* (2006.01)
*B60Q 1/26* (2006.01)

(52) U.S. Cl. .................. 362/488; 362/489; 362/490; 362/491; 362/492

(58) Field of Classification Search .......... 362/488–492
See application file for complete search history.

(56) References Cited

U.S. PATENT DOCUMENTS

| | | |
|---|---|---|
| 5,619,182 A | 4/1997 | Robb |
| 5,902,166 A | 5/1999 | Robb |
| 6,536,928 B1 | 3/2003 | Hein et al. |
| 6,933,680 B2 | 8/2005 | Oskorep et al. |
| 2004/0066148 A1 | 4/2004 | Oskorep et al. |
| 2005/0172298 A1 | 8/2005 | Huang et al. |
| 2006/0109204 A1 | 5/2006 | Chen |
| 2006/0261365 A1 | 11/2006 | Hsu |

*Primary Examiner*—Sandra L O'Shea
*Assistant Examiner*—William J Carter

(57) ABSTRACT

An ambient light control module and method of operating an ambient light control module selectively actuates light modules to provide a desired light color and intensity. The disclosed ambient light control module selectively actuates light modules that are controllable to provide desired colors. The light control module produces uniform signals across the several light modules such that each separate light module will emit the same color. The disclosed example light control module includes a microcontroller with a plurality of output channels including output compare channels and pulse width modulated channels. The output channels are matched to a common clock so that a uniform signal is emitted from any channel to provide the desired uniformity between lighting modules.

19 Claims, 5 Drawing Sheets

AMBIENT LIGHTING MODULE

CROSS REFERENCE TO RELATED APPLICATION

The application claims priority to U.S. Provisional Application No. 60/933,987 filed Jun. 8, 2007 and U.S. Provisional Application No. 60/921,390 filed Apr. 2, 2007.

BACKGROUND OF THE INVENTION

This disclosure relates to a method and module for controlling a vehicle lighting system. More particularly, this disclosure relates to a method and control module for operating a plurality of color selectable lighting modules of a vehicle lighting system.

Lighting within a vehicle can be provided by a lighting module including different colors of light emitting diodes (LED). It is known to generate different colored lights by varying the on time of different colored lights, for example red, green and blue LEDs. Other known combinations of lights include amber, green and blue. Power to each LED of each module can be provided as a pulse width modulated (PWM) signal. However, several problems are inherent in current systems such as the inability to reliably match signals in different lighting groups, and visible jitter that produces an undesirably visible aesthetic appearance.

Accordingly, it is desirable to design and develop a method and device of controlling separate lighting groups to provide uniform color operation without jitter.

SUMMARY OF THE INVENTION

A disclosed ambient light control module and method of operating an ambient light control module selectively actuates light modules to provide a desired light color and intensity.

The disclosed ambient light control module selectively actuates light modules that are controllable to provide desired colors. Each of the light modules includes at least three light emitting diodes (LEDs) of different colors. Selectively actuating on-time and light intensity individually for each of the LEDs provides for the selection of a desired color to provide a desired aesthetic appearance. Further, the example light control module produces uniform signals across the several light modules such that each separate light module will emit the same color.

The disclosed example light control module includes a microcontroller with a plurality of output channels including output compare channels and pulse width modulated channels. The output channels are matched to a common clock so that a uniform signal is emitted from any channel to provide the desired uniformity between lighting modules. Further, each of the output channels is monitored to detect and protect the system from possible faults.

These and other features of the present invention can be best understood from the following specification and drawings, the following of which is a brief description.

DETAILED DESCRIPTION OF THE PREFERRED EMBODIMENT

Figure 1:
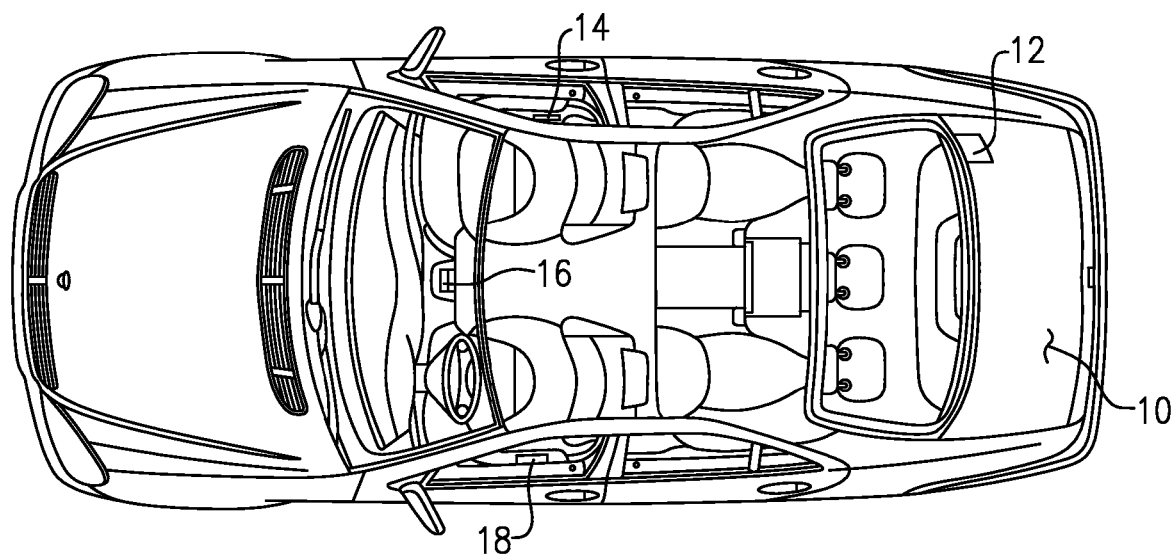
FIG. 1 is a schematic view of a vehicle including an example ambient lighting control module controlling example ambient lighting modules.
Figure 2:
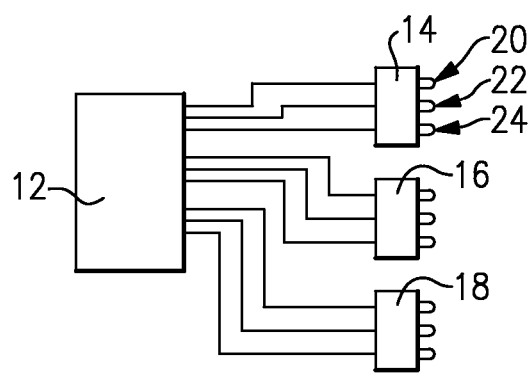
FIG. 2 is a schematic view of example ambient lighting modules.

Referring to FIGS. 1 and 2, an ambient light module 12 is disposed within a vehicle 10 for controlling light modules 14, 16 and 18. The light modules 14, 16, and 18 provide ambient lighting and are controllable to provide desired colors. Each of the light modules 14, 16, and 18 include three light emitting diodes of different colors. The example light emitting diodes for each of the light modules 14, 16, and 18 include a red LED 20, a green LED 22 and a blue LED 24. Selectively actuating on-time and light intensity individually for each of the red, green and blue LEDs 20, 22, and 24 provide for the selection of a desired color to provide a desired aesthetic appearance within the vehicle 10.

The example light modules 14, 16 and 18 can be utilized anywhere within the interior of the vehicle 10. For example, the light modules may provide indirect lighting of the foot wells, or may be directed to light specific features such as cup holders or unique features such as a vehicle nameplate or emblem. The location of the light modules is also not limited to interior structures but may be utilized for exterior lighting applications as desired.

The lighting modules 14, 16 and 18 are uniformly actuatable such that at least two of the three example lighting modules can be lit to provide the same color and light intensity. A desired light color is generated by modulating the on-time of each LED within a lighting module. Varying the on-time of the red, green and blue LEDs 20, 22, and 24 relative to each other can create any desired color. The example LEDs are pulse width modulated to provide the desired on-time required to produce the desired light color and intensity. The required on-time for generating a specific desired light color is as known in the art. The example light control module 12 generates the unique pulse width modulated signal to each individual LED required to provide the required on-time. Further, the example light control module 12 produces uniform signals across the several light modules such that each separate light module will emit the same color.

Figure 3:
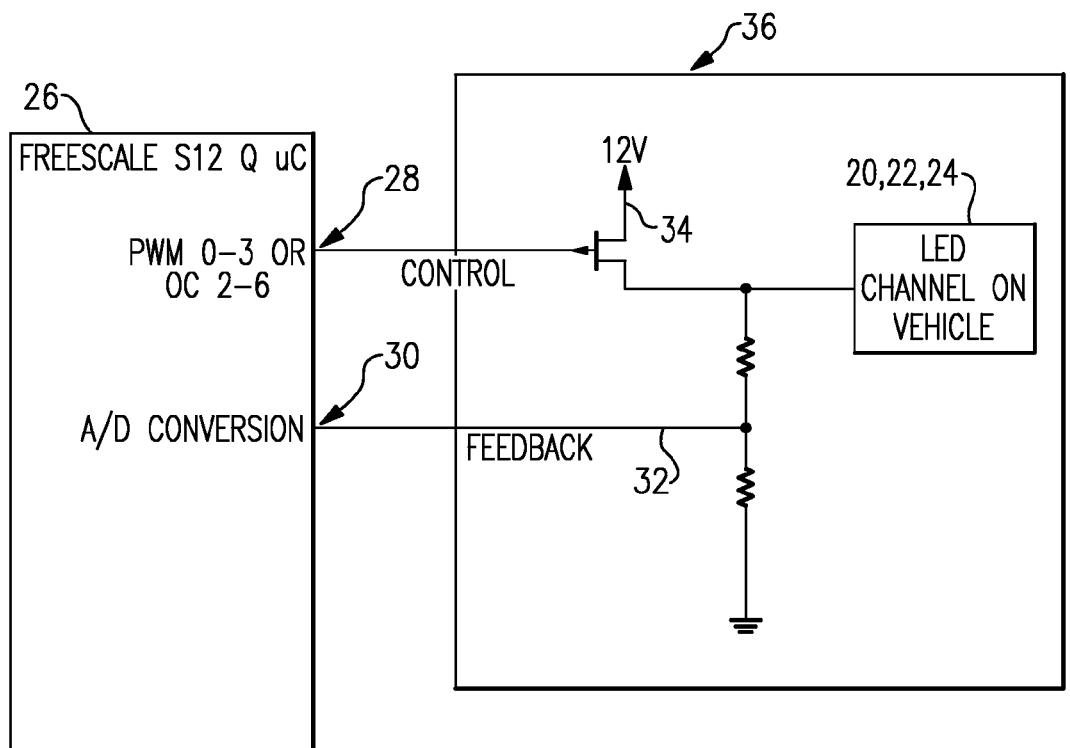
FIG. 3 is a schematic view of a portion of the example ambient lighting control module.

Referring to FIG. 3, the example light control module 12 includes a microcontroller 26 with a plurality of output channels 28. The example microcontroller 26 is a Freescale microcontroller including at least six output compare channels. Five of the output compare channels are utilized to control output pins. The sixth channel (in this example OC7), is used for internal timing purposes. Further, the microcontroller includes at least four pulse width modulated output channels. The Freescale microcontroller is just one example of a microcontroller for this system and method. The light control module 12 could be equipped with an analog multiplexer to increase the number of analog channels the microcontroller can sample. Additionally, the light control module could also include a digital feedback means to detect a fault conditions along the control channels.

Because each light module includes three different LEDs, the microcontroller 26 must provide nine different signals.

Further all nine of the output channels are monitored to detect and protect the system from short circuits. In the example system a short circuit is defined as a current with more than 10 times the nominal current utilized to drive one of the LEDs.

Each of the output channels 28 drives a separate one of the LEDs through a transistor 36. The transistor 36 receives a power source 34 that is switched on and off depending on the control signal 28 from the microcontroller 28. A feedback signal 32 is feedback to an analog to digital input 30 of the microcontroller 26 for analysis and to provide for the detection of short circuits. The feedback signal 32 can also be a digital signal to the microcontroller 26. The disclosed example is an analog to digital converter, but digital feedback is also within the contemplation of this invention. The schematic diagram of FIG. 3 symbolically represents the various individual connections to each one of the nine LEDs.

Figure 4:
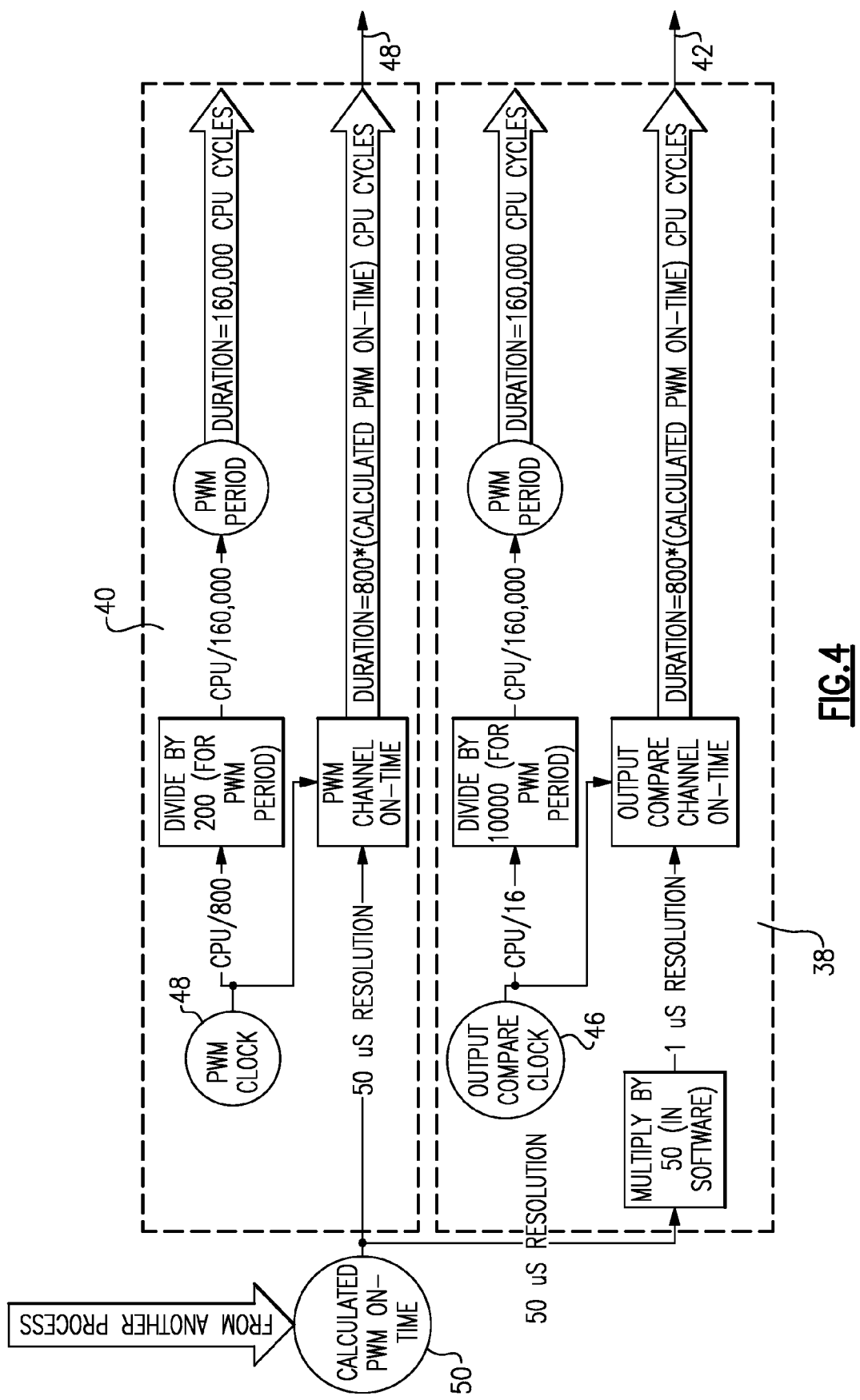
FIG. 4 is a diagram of an example method of creating similar lighting signals from different microcontroller outputs.

As appreciated, the signal generated from an output compare channel 38 and a pulse width modulated output channel 40 will be different. However, both are based on the microcontroller clock. Referring to FIG. 4, the microcontroller 26 matches the output from an output compare channel 38 to the output from the pulse width modulated (PWM) channel 40.

The PWM channel 40 and the output compare channel 38 are both accurate to the microcontroller clock. The example output compare channel runs 1 cycle for every 16 cycles of the microcontroller clock. The period for the output compare clock 46 will be 10,000 times the output compare clock and therefore 160,000 times the microcontroller clock. The PWM clock 49 will run 1 cycle for every 800 microcontroller clock cycles. Therefore 200 times the PWM clock cycle is equal to 160,000 times the microcontroller clock cycle. Each of the PWM clock 48 and the output compare clock 46 are therefore adjusted such that each provides the same output duration. In the illustrated example, the output from the PWM clock is divided by 200, and the output from the output compare clock 46 is divided by 50 so that the effective resolution of the PWM channel 48 and the output compare channel 42 is 800 microcontroller cycles. Accordingly, because the PWM channels and the output compare channels are matched to the microcontroller clock, the signals can be matched to each other across the nine different outputs to the corresponding LED.

A calculated on time indicated at 50 can therefore be input into a PWM channel 40 and an output compare channel 38 and provide a common and matched output signal. In the example, the output signals 48, and 42 would be matched such that like colors in different locations of the vehicle, within different light modules 14, 16, and 18 can be provided without additional signal conditioning hardware or software modifications.

Figure 5:
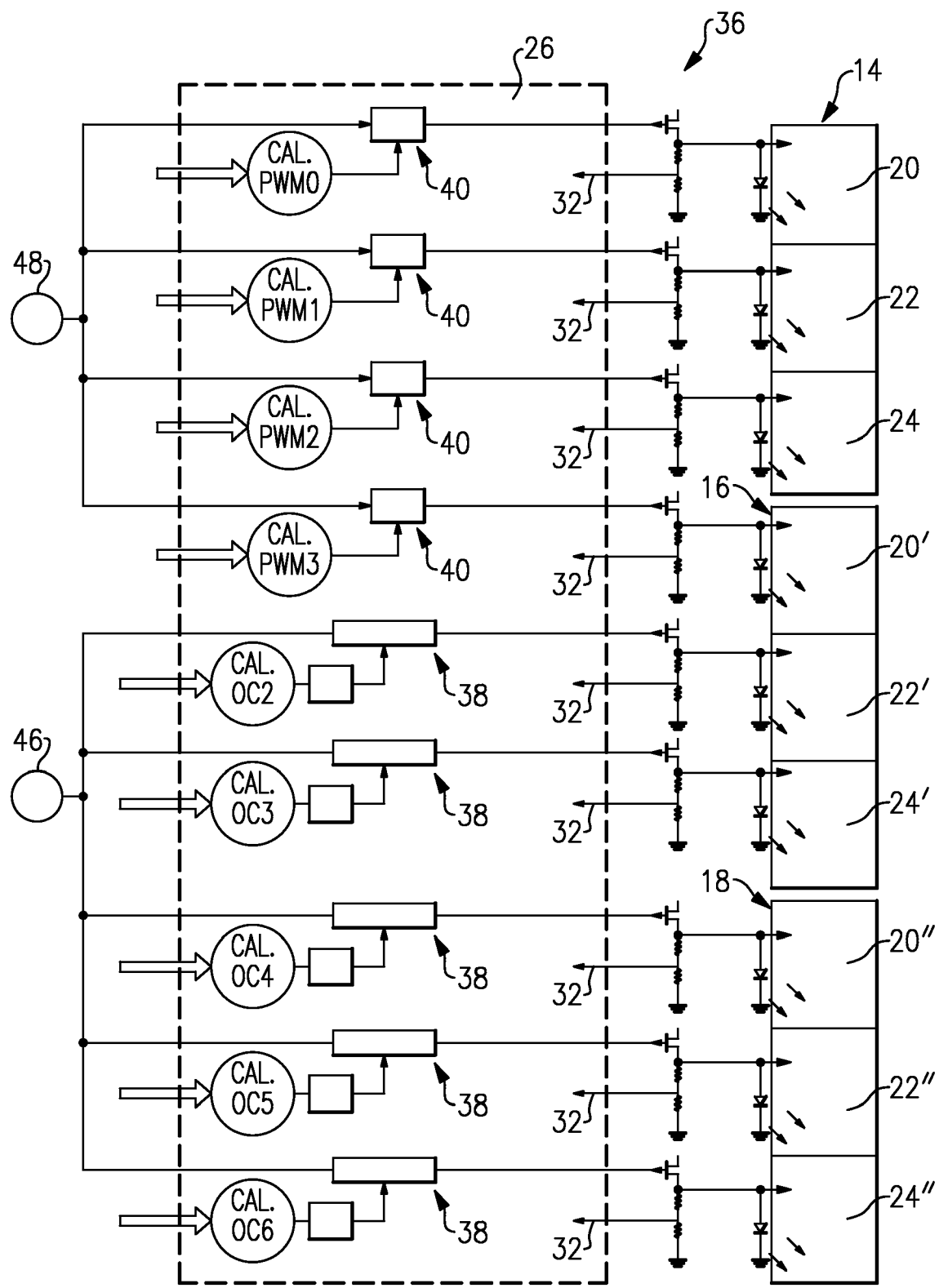
FIG. 5 is a block diagram of the example controller.

Referring to FIG. 5, the output channels 28 of the microcontroller 26 are illustrated schematically for each of the three light modules 14, 16 and 18 and the corresponding LEDs. The example microcontroller 26 utilizes five output compare channels 38 and four PWM channels to drive the required nine LEDs. The first light module 14 includes the red LED, 20, the green LED 22, and the blue LED 24 that are all driven through a corresponding transistor driven by a PWM channel 40. The second light module 16 includes the red LED 20' driven by a PWM channel 40, with the green LED 22', and the blue LED 24' driven by an output compare channel 38. The third light module 18 includes the red, green and blue LEDs 20", 22" and 24" all controlled by an output compare channel from the microcontroller 26. As appreciated different configurations of channels to each of the light modules are possible and within the contemplation of this invention.

In operation it may be desired to match the color emitted from the first light module with the third light module 18. This would require that the red LED 20 from the first module 14 be actuated in the same and matched fashion with the red LED 20" of the third module 18. The corresponding green and blue LEDs would also need to be matched. Because the resolution of both the PWM clock 48 and the output compare clock 46 are matched and corrected to provide the same duration of 800 cycles, matching of corresponding light emitting diodes is provided, and thereby color from different light modules can be matched.

Figure 6:
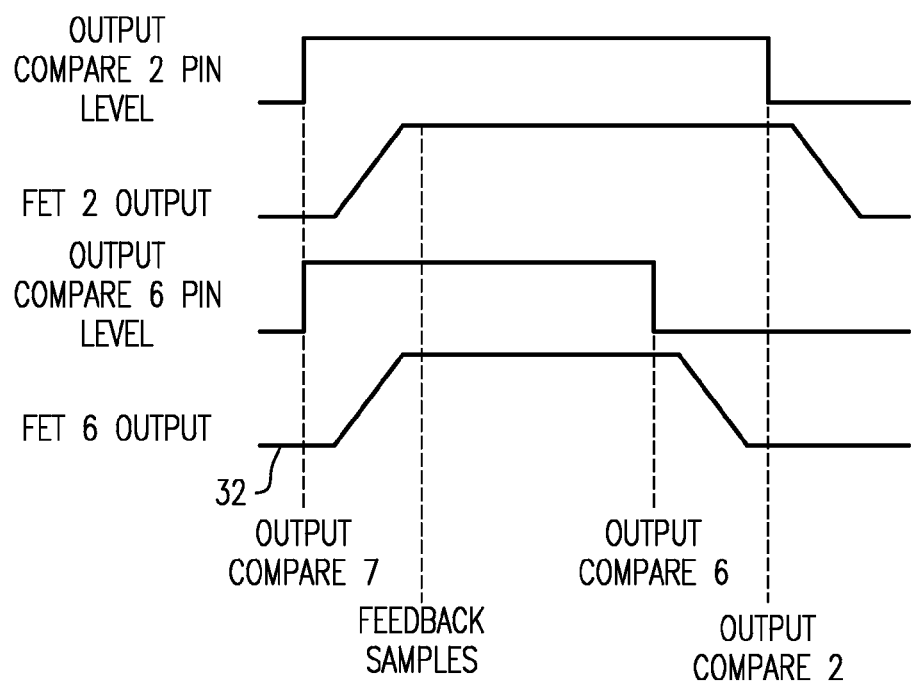
FIG. 6 is a timing chart of example feedback signals for detecting signal fault conditions.

Referring to FIG. 6, feed back signals communicated back to the microcontroller 26 through lines 32 are stored for later analysis to determine whether the loads connected to the transistors 36 are open, shorted or within a nominal range. The example microcontroller 26 operates to monitor the load voltage 34 for each of the control channels 28 with a load applied. This is required do to the required duty cycles for operating each individual LED. The diagnosis for each of the control channels 28 occurs between 5% and 100% duty cycle for a 100 Hz period PWM signal. The example microcontroller 26 will operate to perform diagnostics for each channel that is synchronized with the on-time of each transistor output.

Figure 7:
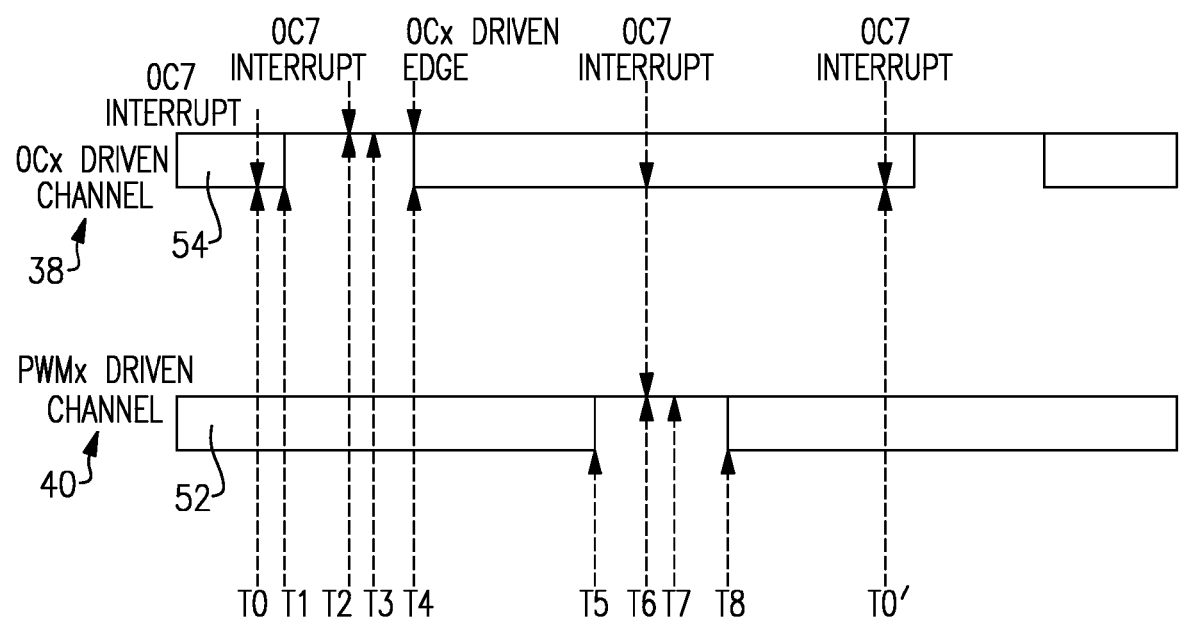
FIG. 7 is a timing chart of example diagnostic method of signals from the example microcontroller.

Referring to FIG. 7, diagnosing the shorted loads is further accomplished by sampling loads during operation as illustrated in FIG. 7. An example signal from each of an output compare driven channel 38 and a PWM driven channel 40 is schematically illustrated. FIG. 7 includes several timing events indicated by the times TN. Time T0 to T0' is the period of output compare channel driven signals 54. Time T5 to T5 is the period of PWM driven channels 40. Time T0 to T5 is the offset for output compare driven PWM feedback reads from PWM driven feedback reads. Time T0 to T1 is the maximum time that the OC7 interrupt can be delayed to synchronize the timer clock. T1 to T2 is the delay time to allow the output compares driven FET to settle. T3 to T4 is the time within which the output compare driven FETs must be read. T6 to T7 is adjusted to slightly more than the maximum time than the OC7 interrupt can be delayed. This time is approximately the same as the T0 to T1 value. Time T6 is synchronized to the PWM clock. Time T7 to T8 is the time during which all PWM driven FETs must be read.

The analysis begins at time T0 when an output compare (OC) interrupt occurs from the output compare channel OC7. The OC7 channel is not utilized as a control channel for an LED but is utilized for diagnosing potential faults. The microcontroller 26 is programmed to initiate the interrupt at time T0 prior to the time T1. The time T1 corresponds to the initial turn-on time of the example output compare driven channel. The T0 interrupt is scheduled early enough before T1 so that possible lags in the system interrupt response time cannot cause the preparation of the output compare timers for the rising edges to occur too late. The T0 interrupt handler prepares the microcontroller's output compare timers to create the rising edge of the output compare signals, and waits for T1. At T1, the rising edge of the output compare signal 54 occurs, the time T2 is set in OC7, and the output compare signal 54 is set to turn off after the desired on-time of this signal has been created (in this example, at time T4), and then returns from the interrupt. At time T2, the next OC7 interrupt time, T6, is determined and set. The controller waits in a loop until time T3. At the time T3 the level of the output compare signal 54 and the feedback signal from the corresponding FET is saved for background diagnosis and then returns from the interrupt.

At time T4, which is the minimum on-time of the output compare driven channel 38, all output compare driven FET feedbacks have been sampled. At T5 the PWM driven channel rising edge of the signal 52 occurs. The OC7 interrupt occurs at the time T6 and the levels of all of the PWM signals are stored for background diagnosis and the next OC7 interrupt time (T0') is determined. The controller waits in a loop until time T7. At time T7, feedback signals from all of the PWM driven FETs are saved for background diagnosis and then the microcontroller returns from the interrupt. Time T8 is the minimum on time for a PWM driven channel and all PWM FET feedback signals are sampled by this time. The process then repeats as indicated at the time T0'.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling a plurality of light modules comprising:
    emitting a first signal from a microcontroller output compare channel for actuating a first light source;
    emitting a second signal from a microcontroller pulse width modulation channel for actuating a second light source; and
    synchronizing the first signal and the second signal for matching actuation of the first light source with the second light sourced, wherein a single microcontroller includes the output compare channel and the pulse width modulation channel each emitting a signal for actuating a corresponding light source within one of the plurality of light modules mounted within a vehicle.

2. The method as recited in claim 1, wherein a single microcontroller includes the output compare channel and the pulse width modulation channel.

3. The method as recited in claim 2, wherein the single microcontroller includes five output compare channels and four pulse width modulation channels each emitting a signal for actuating a corresponding light source.

4. The method as recited in claim 3, including the step of synchronizing at least two of the five output compare channels and the four pulse width modulation channels such that corresponding light sources operate uniformly.

5. The method as recited in claim 3, including at least one light modules including a red light emitting diode, a green light emitting diode and a blue light emitting diode, wherein the method includes selectively actuating each of the red, green and blue light emitting diodes to produce a desired color from the light module.

6. The method as recited in claim 5, including at least two light modules each including one red, green and blue light emitting diode, including the step of synchronizing each color light emitting diode in one of the at least two light modules with one another of the at least two light emitting diodes.

7. The method as recited in claim 1, including the step of applying a correction factor to one of the pulse width modulated channel and the output compare channel such that each outputs a signal of equal cycles.

8. The method as recited in claim 1, including the step of monitoring signal outputs for shorted loads from each of the pulse width modulation channels and the output compare channels by initiating a sampling of each signal prior to an expected on time.

9. A lighting control module comprising:
    a microcontroller including at least four pulse width modulated channels and five output compare channels, wherein at least one light control signal from at least one of the four pulse width modulated channels is synchronized with at least one light control signal from at least one of the five output compare channels, wherein the four pulse width modulated channels and five output compare channels provide signals to corresponding light sources utilized to selectively operate three light modules within a vehicle.

10. The lighting control module as recited in claim 9, wherein a correction factor is applied to the at least one light control signal from the output compare channel to synchronize with the at least one signal from the pulse width modulation channel.

11. The lighting control module as recited in claim 9, including a transistor corresponding with each of the pulse width modulated channels and the output compare channels for driving a corresponding light emitting diode.

12. The lighting control module as recited in claim 9, wherein the microcontroller includes a plurality of analog to digital conversion channels that receive feed back signals from a corresponding plurality of transistors driving a light emitting diode.

13. The light control module as recited in claim 12, wherein the feedback signals from each of the plurality of transistors is utilized for analysis to determine whether the light emitting diode is open, shorted or within a desired operating range.

14. The lighting control module as recited in claim 9 including an analog multiplexer to increase the number of analog channels the microcontroller can sample.

15. The lighting control module as recited in claim 9, including a digital feedback means to detect a fault conditions.

16. The light control module as recited in claim 9, including an output compare channel utilized to generate a constant-rate interrupt source.

17. The light control module as recited in claim 9, wherein the four pulse width modulated channels and the five pulse width modulated channels provide signals utilized to selectively operate three light modules each including three different colored light emitting diodes.

18. The light control module as recited in claim 17 wherein at least two of the three light emitting diodes include light emitting diodes that are operated in unison to provide synchronized lighting.

19. The light control module as recited in claim 17 wherein each light control module includes a red, green and blue light emitting diode selectively illuminated to generate a desired color light.

* * * * *